(12) United States Patent
Holguin et al.

(10) Patent No.: US 6,558,790 B1
(45) Date of Patent: May 6, 2003

(54) WATER VAPOR-PERMEABLE, PRESSURE-SENSITIVE ADHESIVES

(75) Inventors: Daniel L. Holguin, Fullerton; Carol A. Koch, San Gabriel, both of CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/451,076

(22) Filed: Nov. 30, 1999

(51) Int. Cl.⁷ .................................................. B32B 7/12
(52) U.S. Cl. .......................... 428/355 R; 428/355 EN; 428/355 AC; 428/317.1; 428/317.3; 428/343; 525/242; 525/326.9; 525/329.7; 525/330.3; 602/52; 602/54
(58) Field of Search ...................... 428/355 R, 355 EN, 428/355 AC, 317.1, 317.3, 343; 525/242, 326.9, 329.7, 330.3; 602/52, 54

(56) References Cited

U.S. PATENT DOCUMENTS

| | | | |
|---|---|---|---|
| 4,510,197 A | 4/1985 | Shah ........................ 428/220 |
| 4,574,130 A | 3/1986 | Potter et al. ................ 523/111 |
| 4,726,982 A | * 2/1988 | Traynor et al. ............. 428/213 |
| 4,871,812 A | 10/1989 | Lucast et al. ............... 525/186 |
| 5,045,601 A | 9/1991 | Capelli et al. ............ 525/327.1 |
| 5,147,698 A | 9/1992 | Cole ........................... 428/40 |
| 5,175,052 A | 12/1992 | Tokuda et al. .............. 428/355 |
| 5,183,664 A | 2/1993 | Ansell ....................... 424/445 |
| 5,302,629 A | 4/1994 | Berejka ..................... 523/111 |
| 5,362,816 A | * 11/1994 | Snyder et al. .............. 428/355 |
| 5,433,892 A | * 7/1995 | Czech et al. ............... 428/320 |
| 5,468,821 A | 11/1995 | Lucast et al. ............... 526/264 |
| 5,543,151 A | 8/1996 | Shirai et al. ............... 424/448 |
| 5,641,506 A | 6/1997 | Talke et al. ................ 424/443 |
| 5,648,425 A | * 7/1997 | Everaerts et al. ........... 515/103 |
| 5,705,011 A | 1/1998 | Bodford et al. ........ 156/244.22 |
| 5,741,543 A | * 4/1998 | Winslow et al. ............ 428/345 |
| 5,783,209 A | 7/1998 | Imamura et al. ............ 424/448 |
| 5,785,985 A | 7/1998 | Czech et al. ................ 424/448 |
| 5,849,325 A | 12/1998 | Heinecke et al. ........... 424/443 |
| 6,013,722 A | 1/2000 | Yang et al. ................. 524/558 |

FOREIGN PATENT DOCUMENTS

| | | |
|---|---|---|
| EP | 0 130 080 B1 | 5/1988 |
| EP | 0 349 270 B1 | 6/1989 |
| EP | 0 501 124 B1 | 9/1996 |
| EP | 0 531 938 B1 | 1/1997 |
| EP | 0 611 783 B1 | 4/1998 |
| EP | 0 651 984 B1 | 4/1999 |
| WO | 99/37728 | 7/1999 |

OTHER PUBLICATIONS

H.K. Chuang, et al.; Adhesives Age®, Avery Dennison;"Avery Adhesive Test Yields More Performance Data Than Traditional Probe"; Intertec®/K–III Publication; Sep. 1997.
Website; Product Update, Adhesives and Pressure–Sensitive Components; "Suppliers Focus Efforts on Advanced Applications"; Mar. 1998; pp. 1–9.

* cited by examiner

*Primary Examiner*—Duc Truong
(74) *Attorney, Agent, or Firm*—Christie, Parker & Hale, LLP (57) ABSTRACT

Water-permeable, pressure-sensitive adhesives and adhesive constructions are characterized by a MVTR of at least 1,900 g/m²/day and low adhesive edge lift, even after 25 kGy gamma irradiation. The copolymers are formed from a plurality of acrylic monomers, preferably butyl acrylate, 2-ethylhexyl acrylate, hydroxyethyl acrylate, and optionally N-vinyl pyrrolidone.

23 Claims, 3 Drawing Sheets

WATER VAPOR-PERMEABLE, PRESSURE-SENSITIVE ADHESIVES

FIELD OF THE INVENTION

The invention relates to pressure-sensitive adhesives having both a high moisture vapor transmission rate (MVTR) and good skin adhesion.

BACKGROUND OF THE INVENTION

Adhesive laminates used in medical products such as medical tapes, wound care dressings, and consumer bandages need a high MVTR to allow the escape of moisture generated by the skin or by wound exudate. A high MVTR of the laminate prevents moisture from being trapped under the dressing, which could otherwise cause maceration of the skin. High MVTR films are commercially available, but once coated with a pressure-sensitive adhesive (PSA) they typically exhibit a dramatic drop in MVTR, due to the low MVTR of the adhesive layer. Discontinuous coating of the adhesive can be used to achieve a high MVTR of the laminate, however, the laminate no longer serves as a bacterial barrier, necessary for wound care dressings, and discontinuous coating processes are expensive.

To meet Government regulations and customer demands, it is often necessary to gamma irradiate or otherwise sterilize MVTR films and adhesive constructions. Unfortunately, gamma irradiation can diminish the adhesiveness of an MVTR adhesive product. The problem is exacerbated if the product is inadvertently (or purposely) exposed to a double dose of radiation, i.e., 50 kGy instead of the standard 25 kGy dose.

What is needed is an adhesive that has a high MVTR, even when coated as a continuous film, without sacrificing good skin adhesion, so that the edges of the laminate do not lift off the skin during the wear time of the dressing, typically 24 hours. The adhesive should be able to withstand gamma irradiation sterilization without a substantial loss of adhesive strength. The cohesive strength of the adhesive should be sufficiently high to prevent any adhesive residue from being left on the skin upon removal of the adhesive laminate. The adhesive also should be skin-friendly and cause no irritation or cytotoxicity.

SUMMARY OF THE INVENTION

According to the present invention, PSAs and adhesive constructions characterized by high MVTR and good skin adhesion are provided. The PSAs comprise acrylic copolymers formed from a plurality of monomers, and have a composition, glass transition temperature ($T_g$) and weight-average molecular weight ($M_w$) that facilitate high MVTR values and good skin adhesion. Adhesive constructions, i.e., medical tapes, wound care dressings, bandages, and similar products are also provided, and comprise a high MVTR PSA coated on or otherwise applied to a water vapor-permeable backing.

A key advantage of the present invention is the balancing of MVTR and skin adhesion. A desirably high MVTR (i.e., greater than or equal to about 1,900 g/m$^2$/day, more preferably greater than or equal to 2,000 g/m$^2$/day) is realized by selecting the monomeric composition and coat weight in the manner described herein. At the same time, excellent skin adhesion is realized through careful control of molecular weight, gel content, and glass transition temperature.

BRIEF DESCRIPTION OF THE DRAWINGS

These and other features and advantages of the present invention will be better understood when the following detailed description is considered in conjunction with the accompanying drawings, wherein.

DETAILED DESCRIPTION OF THE INVENTION

According to one aspect of the invention, a water vapor-permeable PSA comprises an acrylic copolymer formed from a plurality of monomers. The copolymer is characterized by a MVTR value of at least 1,900 grams per square meter per day (g/m$^2$/day), more preferably at least 2,000 g/m$^2$/day, according to the Mocon test method described below (at a dry coat weight of 25–30 g/m$^2$). When applied to skin, the PSA copolymer exhibits low adhesive edge lift, i.e., 5% or less edge lift when an adhesive laminate made with a Medifilm 390™ high MVTR backing (facestock) is subjected to a skin adhesion test as described below. In a preferred embodiment, the PSA copolymer exhibits low adhesive edge lift even after 25 kGy gamma irradiation. In a more preferred embodiment, the PSA copolymer exhibits low adhesive edge lift (<5%) after exposure to 25 kGy gamma irradiation and <15% edge lift after exposure to 50 kG gamma irradiation. The difference (<5% vs <15%) is acceptable, as it is generally a rare occurrence for a medical (or other) product to be exposed to a double dose of irradiation during gamma sterilization.

In one embodiment, the acrylic copolymer is formed from a plurality of monomers that comprises, on a percent by weight basis, based on the total weight of monomers, about 5 to 75% butyl acrylate (BA) and/or ethyl acrylate (EA), about 5 to 45% 2-ethylhexyl acrylate (2-EHA) and/or isooctyl acrylate (IOA), and about 20 to 50% hydroxyethyl acrylate (HEA). Optionally, the plurality of monomers also includes up to about 10% of a N-vinyl lactam, for example, N-vinyl pyrrolidone (NVP). The short chain alkyl acrylates (i.e., BA and/or EA), in combination with the hydroxyethyl acrylate (HEA) monomer, are important for obtaining a high MVTR. The longer chain alkyl acrylates (i.e., 2-EHA and/or IOA) are important for keeping the glass transition temperature, $T_g$, sufficiently low that the polymer functions as a PSA and adheres well to skin.

In some embodiments, it is advantageous to exclude carboxylic acid monomers, i.e., acrylic acid (AA), methacrylic acid (MAA), itaconic acid (IA), and P-carboxyethyl acrylate (β-CEA), from the plurality of monomers that will form the copolymer. The exclusion of such acid monomers allows a wider range of polymer molecular weights to be used, without the risk of an undesirable degree of crosslinking during elevated temperature aging and gamma ray sterilization of the adhesive or adhesive laminate. Indeed, carboxylic acid-free PSAs and PSA laminates prepared according to the invention exhibit excellent skin adhesion and show little edge lift, even after 50 kGy gamma ray sterilization. Nonlimiting examples of representative acid-free polymer compositions according to the present invention include the following:

| Monomer (%) | A | B | C | D | E | F | G |
|---|---|---|---|---|---|---|---|
| BA (and/or EA) | 75 | 45 | 55 | 52 | 52 | 20 | 5 |
| 2-EHA (and/or IOA) | 5 | 5 | 12 | 12 | 12 | 30 | 45 |
| HEA | 20 | 50 | 33 | 30 | 33 | 50 | 50 |
| NVP | — | — | — | 6 | 3 | — | — |

Notwithstanding the preceding comments, in another embodiment of the invention, a small amount of one or more carboxylic acid monomers is included in the monomer mixture, and the copolymer molecular weight is simply kept sufficiently low to avoid the disadvantages of including such monomers in the formula. Thus, a high MVTR, low adhesive edge lift PSA can be prepared from a plurality of monomers comprising about 5 to 75% BA (and/or EA), about 5 to 45% 2-EHA (and/or IOA), about 20 to 44% HEA, and a positive amount up to about 6% AA and/or MAA, with the weight-average molecular weight of the copolymer being kept below about 300,000.

In some embodiments, minor amounts of other free-radical polymerizable monomers can be included, so long as the resulting copolymer has a $T_g$ of from about −25 to −15° C., and preferably a MVTR of at least about 1,900 g/m²/day, more preferably at least 2,000 g/m²/day. Non-limiting examples of such monomers include vinyl acetate, styrene, acrylonitrile, and acrylamide. In every embodiment, the relative amounts of the plurality of monomers used sum to 100% by weight, based on the weight of all monomers.

Figure 1:
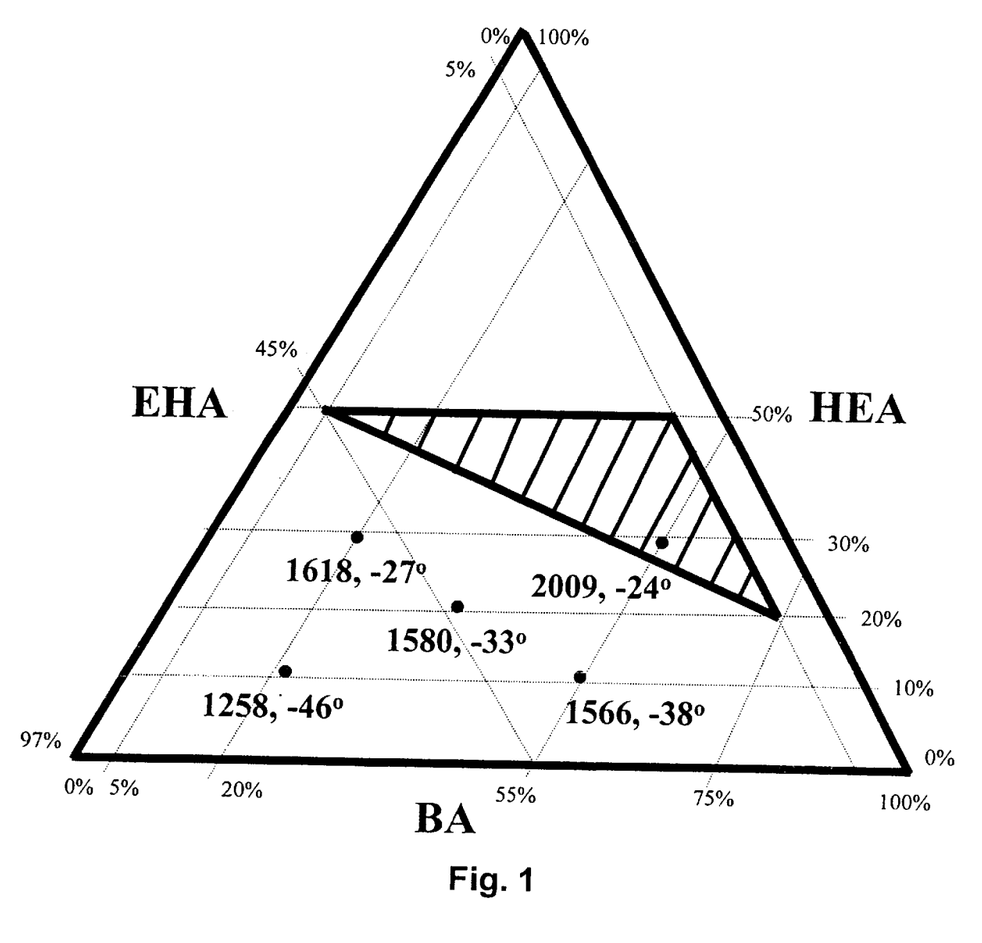
FIG. 1 is a three-axis plot of monomer composition.

The selective combination of BA (and/or EA) and 2-EHA (and/or IOA) with HEA is important to achieving a balance of high MVTR and good skin adhesion (low adhesive edge lift). FIG. 1 shows the relationship between monomer amount, MVTR, and $T_g$ for polymers made from 2-EHA, BA, HEA, and a small amount of AA. The three axes represent the concentration of EHA, BA, and HEA, respectively. All polymer compositions depicted contain 3% by weight of AA as a fourth monomer, and all compositions are crosslinked with 0.1% by weight of aluminum acetylacetonate (AAA). The five data points plotted in the figure correspond to the compositions of Comparative Examples 3–6 and Example 7 (described below), and the values associated with each point are the MVTR and $T_g$ of each example. The data shows that, of the three monomers, HEA has the greatest impact on MVTR. With increasing MVTR, there is a corresponding increase in $T_g$. There is a relatively small area within the composition map that gives an MVTR greater than 1900 g/m²/day and a $T_g$ low enough to give good adhesion properties. This area is the small shaded triangle within the figure, and includes representative compositions prepared according to the present invention.

Similar three-axis figures can be prepared for polymers made with EA, IOA, and HEA, polymers made with mixed monomer systems (BA/EA, 2-EHA/IOA, HEA), other acid-containing polymers, polymers containing NVP, etc.

The adhesive copolymer is formed using conventional polymerization techniques, such as solution, emulsion, hot melt, and on-web, UV polymerization. In a preferred embodiment, the copolymer is prepared by free radical, solution polymerization, in a solvent (or mixture of solvents) in which each of the monomers is soluble. Non-limiting examples of such solvents include ethyl acetate, methanol, toluene, methyl ethyl ketone, acetone, hexane, and isopropyl alcohol. Polymerization is initiated using a conventional free radical initiator, for example, persulfates, peroxides, hydroperoxides, and azo compounds such as VAZO™ initiators. The amount of initiator used will, of course, affect the molecular weight of the copolymer. In general, polymerization is carried out with about 0.05% to 0.5% by weight of initiator, based on the weight of monomers used. Pilot scale polymerization (and, presumably, commercial scale polymerization) tends to require a lower relative amount of initiator than does laboratory scale polymerization.

A small amount (i.e., up to about 1%, more preferably less than about 0.5% by weight) of a crosslinker can be added after polymerization to increase the cohesive strength of the polymer and improve the convertibility of the adhesive laminate, without adversely affecting the MVTR. A non-limiting example of such an agent is aluminum acetylacetonate (AAA). Crosslinking the polymer also helps reduce adhesive residue when the adhesive is removed from skin.

Polymer molecular weight and gel content are important properties of the PSA, and should be controlled for optimum performance. In general, low molecular weight polymers are easier to coat, but have less cohesive strength, than high molecular weight polymers. High molecular weight polymers tend to have less tack than low molecular weight polymers. This is exacerbated by gamma irradiation processes used to sterilize adhesive wound care dressings and other products. Gamma irradiation of high molecular weight polymers can result in poor skin adhesion (i.e., high % edge lift). The effect is particularly noticeable with polymers that contain acid monomers (e.g., acrylic acid) in the polymer formula. Including N-vinyl lactams (e.g., N-vinyl pyrrolidone) in the monomer mixture can help minimize this. Adding an antioxidant to the PSA composition also can help reduce the gel-forming effects of gamma irradiation. High molecular weight polymers formed with acid monomers also tend to exhibit higher viscosities. This can result in a reduced shelf life and problems with coating.

Preferred adhesive copolymers according to the present invention have weight-average molecular weights ($M_W$) of from about 200,000 to 600,000, or even slightly higher, depending on the monomers used to make the copolymers. When the monomer mixture contains acrylic and/or methacrylic acid, it is desirable to keep the polymer $M_w$ below about 300,000. Non-acid-containing polymers can have higher molecular weights, e.g., as high as 550,000 or even 600,000. Of course, if the resulting PSA will be gamma irradiated, it is desirable to keep the $M_w$ below about 550,000. Polymer molecular weight can be controlled by adjusting the amount of initiator and/or solvent used, and/or by adding a chain transfer agent, for example, n-dodecyl mercaptan (n-DDM).

After polymerization, the resulting polymer solution can be used to prepare an adhesive laminate or construction using fabrication techniques well known in the art. Thus, the polymer solution can be coated on a release liner (such as a siliconized paper or film), air- or oven-dried, and then laminated to a flexible backing, i.e., a facestock. Alternatively, the adhesive solution can be coated directly on a facestock, dried, and then protected with a release liner. Self-wound tapes also can be prepared, by coating the PSA copolymer on one side of a tape facestock. (The other side of the facestock is silicone-coated or otherwise treated so that the tape can be wound up on itself without blocking.)

Nonlimiting examples of conventional PSA coating methods include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating.

Figure 2:
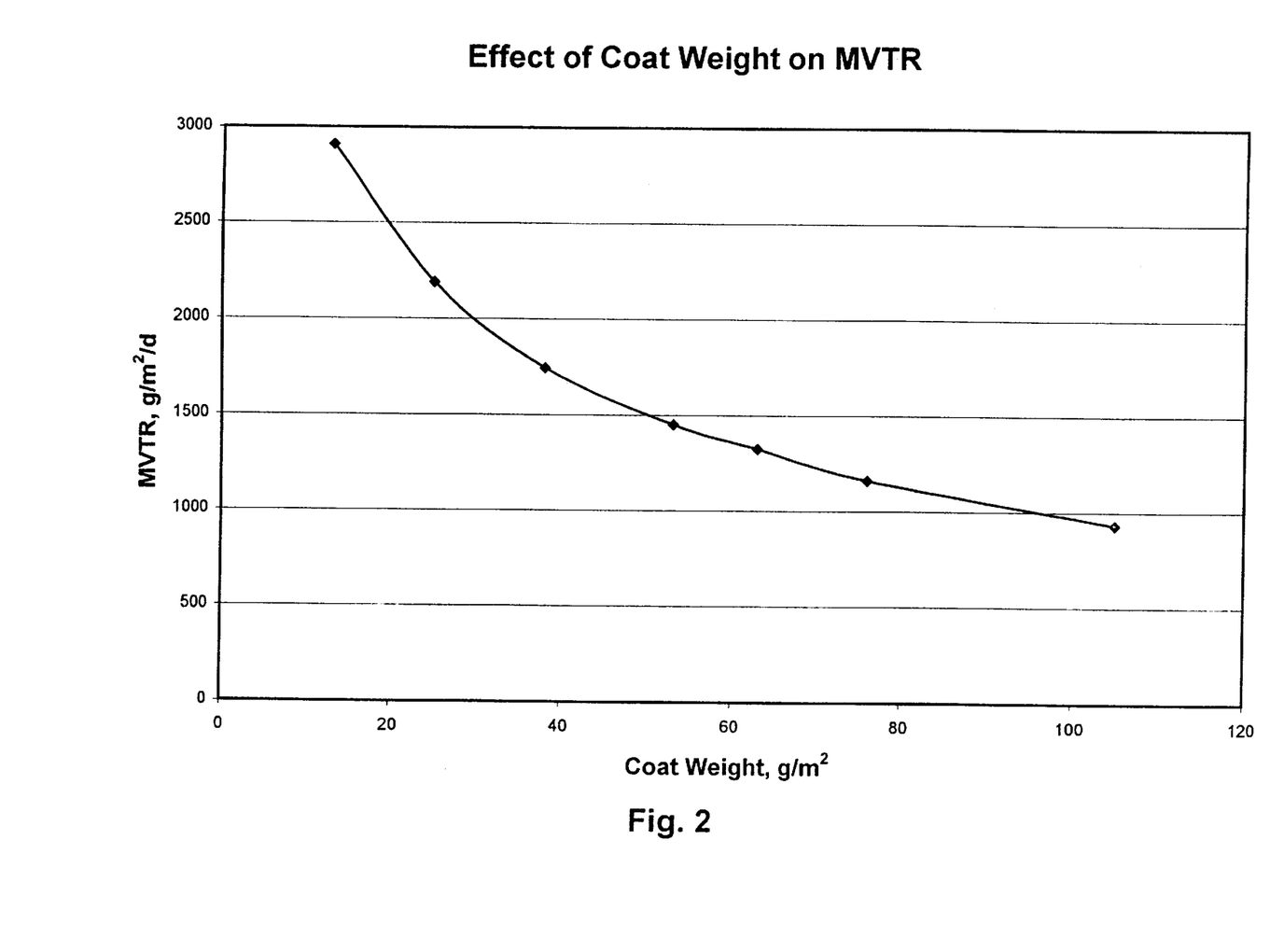
FIG. 2 is a plot showing the effect of adhesive coat weight on MVTR.

The adhesive coating is applied at a desirable coat weight (conveniently measured on a dried basis), which generally lies within the range of about 15 to 100 grams per square meter (g/m² or "gsm"), more preferably about 25 to 30 g/m². The effect of coat weight on MVTR is shown in FIG. 2. Samples of an adhesive (Example 2) were coated on a siliconized release liner at dry coat weights of from 13 to 105 g/m² and laminated to a Medifilm 390™ facestock (described below). MVTR values (measured according to the Mocon test method) were significantly higher at low coat weights. At a coat weight of from 25 to 30 g/m², the MVTR for Example 2 is about 2000 to 2200 g/m²/day.

Adhesive laminates suitable for use as medical tapes, wound care dressings, bandages, and similar products are prepared by applying the above-described adhesive copolymer to a flexible facestock having a high MVTR, preferably 4,000 g/m²/d or higher. Non-limiting examples of high MVTR materials include Medifilm 390™, a one mil thick film from Mylan Technologies, St. Albans, Vt., made with Hytrel® 8206 resin, a copolyester thermoplastic elastomer available from Du Pont de Nemours, E.I., Co., Wilmington, Del. Medifilm 390™ has a MVTR of 8,000 to 10,000. Other facestocks that have a high MVTR and are commonly used in medical products include polyurethanes film and foams, Pebax® (a polyether block amide resin from Elf Atochem, North America, Philadelphia, Pa.) and woven or non-woven fabrics. The thickness of such high MVTR materials can vary from a few microns up to several millimeters. Depending on the end product application, the adhesive can be coated on all or a portion of the facestock.

EXAMPLE AND TEST METHODS

Several nonlimiting examples of high MVTR PSAs were prepared, along with several comparative examples. Samples were analyzed for molecular weight, gel content, viscosity, MVTR, skin adhesion, irradiation effects, adhesive performance, cohesive strength, and elevated temperature aging effects, using the procedures described below. Polymer glass transition temperatures ($T_g$) were determined by differential scanning calorimetry.

Molecular Weight

Polymer samples were analyzed by GPC for molecular weight information, prior to any gamma irradiation or elevated temperature aging. About 200 mg of wet adhesive was dispersed in 10 mL of solvent, tumbled for 2 to 4 hours, and filtered through a 0.45 micron PTFE syringe filter. The injection size was 50 μL. Calibration was against a set of twelve polystyrene standards obtained from Polymer Labs, ranging from 580 to 1,290,000 Da. Millenium$^{32}$ version 3.0 software from. Waters was used with the GPC option. Calibration was done daily and a check sample of SRM 706 polystyrene from the National Institute for Standards and Technology (Gaithersburg, Md.) was also analyzed daily with each batch of samples. A Waters (Milford, Mass.) 2690 pumping system was used with a Waters 410 refractive index detector. The columns were three Plgel Mixed-C 300 mm×7.5 mm with a 50 mm×7.5 mm guard column from Polymer Labs (Amherst, Mass.). The mobile phase was THF at 1.0 mL/min.

Gel Content

Gel content is a measure of the amount of polymer that is insoluble in tetrahydrofuran (THF). It is determined as follows: The adhesive polymer is coated on a silicone release liner and dried at 70° C. for 15 minutes. The adhesive is removed from the release liner, and a 60–80mg sample of the adhesive is accurately weighed out and placed in a ten micrometer polytetrafluroethylene membrane filter. The edges of the filter are thermally sealed to contain the sample, and the filter is placed in a vial containing about 15 g of THF. The vial is agitated for 72 hours, and the filter is taken out of the solvent and dried at an 120° C. for 120 minutes. The filter is then weighed, and the resulting weight of the sample is used to calculate the percent gel as follows:

$$\% \text{ gel}=(b/a)\times 100$$

where,
a=initial weight of sample, and
b=final weight of sample.

Viscosity and Relative Viscosity

Polymer viscosity was measured at 23–25° C. on a Brookfield viscometer, using a #3 spindle, at 30 rpm, unless otherwise noted. Relative viscosity (RV) is measured as the ratio of outflow time for (i) a 2.22% (solids-by-solids) solution of the adhesive polymer in ethyl acetate to (ii) pure ethyl acetate, measured using an Oswald-Fensche No. 50 viscometer at 20° C.

MVTR

The moisture-vapor transmission rate (MVTR) is the rate at which moisture permeates a dressing, film, or other construction, generally measured in grams per square meter per day (g/m²/day). Different methods for measuring MVTR include the Mocon method, the upright method for low moisture contact. (indirect liquid contact with the dressing), and the inverted method for high moisture contact (direct liquid contact with the dressing).

MVTR by Mocon is measured according to INDA Standard 70.4(99). An adhesive laminate is prepared by coating the adhesive on a silicone release liner and drying in a 70° C. oven for 15 minutes. The adhesive is laminated to a high MVTR facestock (typically, Medifilm 390™), removed from the release liner, and laminated to a second high MVTR facestock. The target coat weight of the adhesive is 25 to 30 g/m², on a dry basis. The sample is tested using the Permatran-We Model lOOK instrument available from Mocon (Minneapolis, Minn.). The sample is conditioned for 15 minutes at 38° C. Each sample is tested six times and the standard deviation is typically 50 g/m²/day. The adhesive layer is sandwiched between two films in order to prevent contamination of the instrument. This results in somewhat lower measured values than would be expected for an adhesive on a single layer of film. In the tables that follow, MVTR values were determined using the Mocon method, unless otherwise indicated.

MVTR by cup method is measured according to Water Method of ASTM E96-94 at 40° C. and 20% relative humidity over a 24 hour period. The sample tested is a 25–30 g/m² (dry weight) adhesive layer on a single high MVTR facestock. The cups have a 25 cm² area opening and are available from BYK-Gardner, Inc. (Silver Spring, Md.). For the upright cup test, approximately 10 g of purified water is placed in the cup, while for the inverted cup test, 20 g of purified water is used. The water is ultrapure, deionized water with a resistance of at least 18 megaohms.

Figure 3:
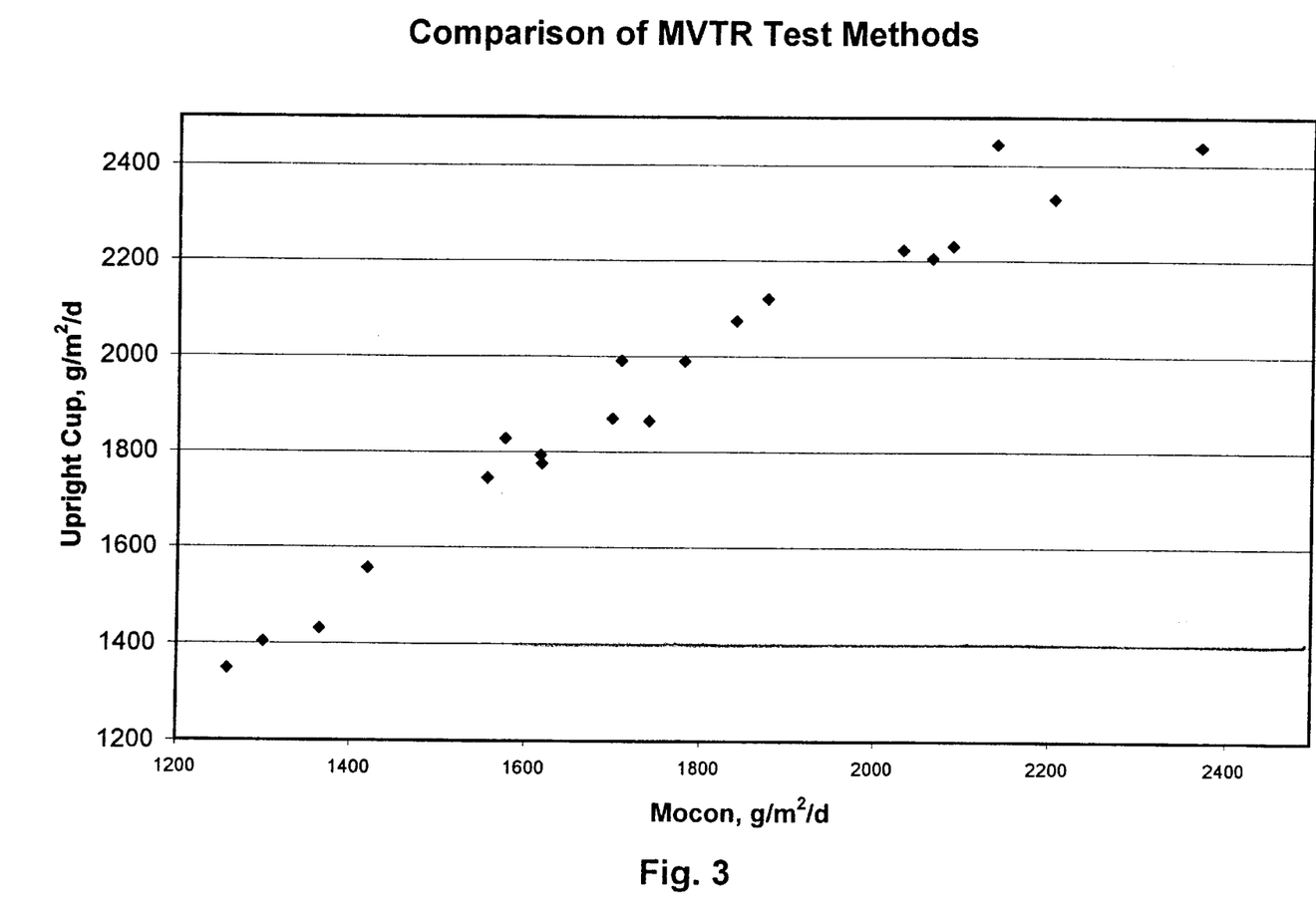
FIG. 3 is a plot of MVTR measured by the Mocon test method versus the upright cup test method.

A comparison of MVTR measurements by different test methods is presented below, in Table 9. There is a strong correlation between the Mocon and the upright cup test method. This is shown in FIG. 3, which plots Mocon and upright cup test method data for samples having MVTRs of 1200 to 2500 g/m²/day.

Skin Adhesion

Strips of the adhesive laminates were cut into 0.5×4 inch samples and applied to the inside forearms of ten volunteers after cleansing their skin with isopropanol and allowing it to air dry. The samples were applied with finger pressure and without stretching the strip. The samples were checked after a 24 hour period and evaluated for edge lift as a percentage of the total area of the test strips. The sample was manually removed and the skin was checked for any remaining adhesive residue. The amount of residue (none, low, medium, or high) was rated on a scale of 0–3.

Gamma Ray Sterilization

Gamma irradiation and ethylene oxide (EtO) gas are commonly used, low-temperature processes for rendering medical products sterile. (Steam sterilization is generally an undesirable method for sterilizing PSAs, because of the high temperatures and high levels of moisture involved.) EtO sterilization generally does not affect the properties or performance of PSA constructions. It is known, however, that at higher radiation dosages (50 kGy or higher) gamma irradiation may result in slightly lower peel adhesion values, with the potential for the adhesive welding to the release-liner. Antioxidants can be added to minimize the effects of irradiation. The effect of gamma irradiation on the adhesive performance of PSA laminates prepared in accordance with the present invention, was evaluated using a colbalt-60 gamma radiation source, at target minimum doses of 25 kGy and 50 kGy.

Peel Adhesion

The adhesive was coated at an approximate coat weight of 25 g/m2 (1.0 mil) onto a silicone coated release liner and then laminated to a 2 mil Mylar facestock, forming a laminate construction. The resulting construction was die-cut into 25×204 mm (1×8 in) sized strips. The strips were then applied centered along the lengthwise direction to 50×152 mm (2×6 in) brightly annealed, highly polished stainless steel test panels and rolled down using a 2 kg (4.5 lb.), 5.45 pli 65 shore "A" rubber-faced roller, rolling back and forth once, at a rate of 30 cm/min (12 in/min). The samples were conditioned for either 15 min. or 24 hours in a controlled environment testing room maintained at 21° C. (70° F.) and 50% relative humidity. After conditioning, the test strips were peeled away from the test panel in an Instron Universal Tester according to a modified version of the standard tape method Pressure-Sensitive Tape Council, PSTC-1 (rev. 1992), Peel Adhesion for Single Coated Tapes 180° Angle, where the peel angle was either 180° or 90°, i.e., perpendicular to the surface of the panel, at a rate of 30 cm/min (12 in/min). The force to remove the adhesive test strip from the test panel was measured in lbs/in. Glass panels and high density polyethylene panels were also used to measure peel adhesion. All tests were conducted in triplicate.

Loop Tack

Loop tack measurements were made for samples cut to 25×204 mm (1×8 in) sized strips using stainless steel or glass as the substrate at a withdraw rate of about 305 mm/min (12 in/min), according to standard test 1994 TLMI Test L-IB2, TLMI Loop Tack Test, by the Tag and Label Manufacturers Institute Inc. (TLMI), using an Instron Universal Tester Tester Model 4501 from Instron (Canton, Mass.) . Loop tack values were taken to be the highest measured adhesion value observed during the test. All tests were conducted in triplicate.

Room Temperature Shear (RTS)

In static shear testing, the samples were cut into 12×51 mm (½×2 in) test strips. The test strips were applied to brightly annealed, highly polished stainless steel test panels, where the typical size of the test panels was 50×75 mm (2×3 in), making a sample overlap of 12×12 mm (½×½ in) with the test panel. The sample portion on the test panel was rolled down using a 2 kg (4.5 lb.), 5.45 pli 65 shore "A" rubber-faced roller, rolling back and forth once, at a rate of 30 cm/min (12 in/min). After a dwell time of at least 15 minutes under standard laboratory testing conditions, the test panels with the test strips on them were then placed at an angle 20° from the vertical, and a load of 500 g was attached to the end of the test strips. The time in minutes for the sample to fail cohesively was measured by a timer. In the tables, the plus sign after the shear values indicate that the samples were removed after that time and that the test was discontinued. All tests were conducted in triplicate.

Failure Modes

The following adhesive failure modes were observed for some samples: "panel failure" (p)—the adhesive construction detached from the panel cleanly, without leaving a residue; "panel staining" (ps),—the adhesive construction detached cleanly, but left a faint stain or "shadow" on the panel; "high panel staining (hps)—the adhesive construction left a markedly noticeable stain on the panel; "cohesive failure" (c)—the adhesive construction split apart, leaving adhesive residue on the test panel and the facestock; "facestock failure" (fs)—the adhesive completely detached from the facestock, and transferred to the test panel; "zippy" (z)—the adhesive construction detached from the panel with a slip-stick, jerky release; and "mixed"-mixed failure modes.

Avery Adhesion Test (AAT)

AAT measurements were made using the procedure described in *Adhesives Age,* vol. 10, no. 10 (September 1997), pages 18–23, which is incorporated by reference herein.

Elevated Temperature Aging

Adhesives made with the methods described herein were conditioned in a 50° oven for one week, and then tested for % gel, room temperature shear, and % edge lift.

EXAMPLE 1

A high MVTR, solvent-based acrylic polymer was prepared using the ingredients listed in Table 1, according to the following procedure: A polymerization reactor equipped with a heating jacket, nitrogen inlet valve, stirring mechanism, and reflux condenser was purged with nitrogen, the heating jacket was set to 80° C., and the initial solvent charge was added. The stirring mechanism was set to 125 RPM. A monomer mixture was weighed out and mixed for ten minutes. One hundred grams of the monomer mix were drawn off for the initial monomer charge, which was added to the reactor, and the contents of the reactor were heated to reflux. After kick-off (77–78° C.) the batch was held for 15 minutes, with agitation. The monomer delay was set at 3.20 g/min for 180 minutes, and the batch temperature was maintained at 76–80° C. After the monomer feed delay was complete, the reactor contents were held for one hour, with agitation. The first cook-off catalyst was then added, and the reactor was held for one hour, followed by the second cook-off catalyst, with an additional one hour hold. The third cook-off catalyst was added, with another one hour hold, and then a final charge of solvent was added, and the reactor contents were cooled and discharged. Following polymerization, the wet adhesive was coated on a siliconized release liner, dried at 70° for 15 minutes, and laminated to a facestock. A 1.5 to 2.0 mil thick Mylar®, facestock was used for peel, shear, and tack testing , while a 1.0 mil thick Medifilm 390™ facestock was used for MVTR and adhesive wear testing.

EXAMPLES 2–6

Using the procedure described above for Example 1, a set of high MVTR, solvent-based, acrylic polymers and adhesive laminates were prepared. Polymerization components for Examples 1–6 are listed in Table 1. In each of Examples 2, 4, 5, and 6, the jacket temperature, kick-off temperature, and batch temperature maintenance were the same as in Example 1. For Example 3, the jacket temperature was 85° C., kick-off temperature was 85° C., and the batch temperature during the monomer feed was maintained at 78–82° C.

Comparative Example 1

The procedure described above for Example 1 was used to make a solvent-based, acrylic polymer and adhesive laminate as a comparative example. Polymerization components are listed in Table 1. The jacket temperature was set at 800C, the kick-off temperature was 76–77° C., and the batch temperature was maintained at 72–80° C. during the monomer delay.

Comparative Example 2

A solvent-based acrylic polymer according to European Patent No. EP 0 501 124 B1 was prepared, using the components listed in Table 2. A polymerization reactor equipped with a heating jacket, nitrogen inlet valve, stirring mechanism, and reflux condenser, was purged with nitrogen, and the heating jacket was set to 85° C. In separate vessels, each of a monomer mixture, initiator solution, and initial monomer charge were weighed out and mixed for ten minutes. The initial monomer charge was then added to the reactor and heated to reflux. After kick-off (82–84° C.), the batch was held for 15 minutes, with agitation. A monomer delay was set for 2.23 g/min. for 120 minutes. An initiator delay was set for 0.22 g/min. for 210 minutes, and the batch

TABLE 1

Polymerization Components for Examples 1–6 and Comparative Examples 1

| Components (grams) | Ex. 1 | Ex. 2 | Ex. 3 | Ex. 4 | Ex. 5 | Ex. 6 | C. Ex. 1 |
|---|---|---|---|---|---|---|---|
| Initial Solvent Charge | | | | | | | |
| Methanol | 10.0 | 10.0 | | 10.0 | 10.0 | 10.0 | 10.0 |
| Ethyl Acetate | 190.0 | 190.0 | 200.0 | 190.0 | 190.0 | 190.0 | 190.0 |
| | 200.0 | 200.0 | 200.0 | 200.0 | 200.0 | 200.0 | 200.0 |
| Monomer Mix | | | | | | | |
| 2-Ethylhexyl Acrylate | 48.0 | 48.0 | 48.0 | 48.0 | 140.0 | | 212.0 |
| Isooctyl Acrylate | | | | | | 48.0 | |
| Butyl Acrylate | 220 | 220 | 208.0 | 220.0 | | 220.0 | |
| Ethyl Acrylate | | | | | 140.0 | | |
| 2-Hydroxyethyl Acrylate | 132.0 | 132.0 | 120.0 | 120.0 | 120.0 | 132.0 | 100.0 |
| N-Vinyl Pyrrolidone | | | 24.0 | | | | |
| Methyl Acrylate | | | | | | | 88.0 |
| Acrylic Acid | | | | 12.0 | | | |
| Vazo 64 | 0.8 | 1.6 | 0.8 | 1.6 | 1.6 | 1.6 | 0.8 |
| | 400.8 | 401.6 | 400.8 | 401.6 | 401.6 | 401.6 | 400.8 |
| Initial Monomer Charge | | | | | | | |
| Monomer Mix | 100.0 | 100.0 | 100.0 | 100.0 | 100.0 | 100.0 | 100.0 |
| Monomer Delay | | | | | | | |
| Methanol | 15.0 | | | | | | 15.0 |
| Ethyl Acetate | 275.0 | 275.0 | 265.0 | 275.0 | 275.0 | 275.0 | 275.0 |
| Monomer Mix | 301.6 | 301.6 | 300.8 | 301.6 | 301.6 | 301.6 | 301.6 |
| | 591.6 | 576.6 | 565.8 | 576.6 | 576.6 | 576.6 | 591.6 |
| 1st Cook-off Catalyst | | | | | | | |
| Ethyl Acetate | 10.0 | 10.0 | 10.0 | 10.0 | 10.0 | 10.0 | 10.0 |
| Vazo 64 | 0.4 | 0.4 | 0.4 | 0.4 | 0.4 | 0.4 | 0.4 |
| 2nd Cook-off Catalyst | | | | | | | |
| Ethyl Acetate | 10.0 | 10.0 | 10.0 | 10.0 | 10.0 | 10.0 | 10.0 |
| Vazo 64 | 0.4 | 0.4 | 0.4 | 0.4 | 0.4 | 0.4 | 0.4 |
| 3rd Cook-off Catalyst | | | | | | | |
| Ethyl Acetate | 10.0 | 10.0 | 10.0 | 10.0 | 10.0 | 10.0 | 10.0 |
| Vazo 64 | 0.4 | 0.4 | 0.4 | 0.4 | 0.4 | 0.4 | 0.4 |
| Final Solvent | | | None | | None | None | |
| Toluene | 29.0 | 29.0 | | 29.0 | | | 29.0 |
| Isopropyl Alcohol | 50.0 | 50.0 | | 50.0 | | | 50.0 |
| Methanol | | 15.0 | | 15.0 | | | |
| | 79.0 | 94.0 | | 94.0 | | | 79.0 |
| Total | 1001.2 | 1001.2 | 897.0 | 1001.8 | 907.8 | 1001.2 | 1001.2 | temperature was maintained at 80–84° C. After the monomer feed delay was complete, the initiator delay was continued for 90 minutes. After the initiator delay was completed, the reactor contents were held for one hour, with agitation. The final solvent dillution was added, and the reactor contents were cooled and then discharged. The wet adhesive was coated on a siliconized release liner, dried at 70° C. for 15 minutes, and laminated to a facestock, as in Example 1.

TABLE 2

Polymerization Components for Comparative Example 2

| Components | Mass (g) |
|---|---|
| Monomer Mix | |
| 2-Ethylhexyl Acrylate | 159.0 |
| Methyl Acrylate | 66.0 |
| 2-Hydroxyethyl Acrylate | 75.0 |
| Glycidyl Methacrylate | 0.45 |
| Ethyl Acetate | 6.0 |
| | 306.5 |
| Initiator Solution | |
| Ethyl Acetate | 58.7 |
| Vazo 64 | 0.9 |
| | 59.6 |

TABLE 2-continued

Polymerization Components for Comparative Example 2

| Components | Mass (g) |
|---|---|
| Initial Monomer Charge | |
| Monomer Mix | 76.6 |
| Initiator Solution | 12.6 |
| Toluene | 4.5 |
| Ethyl Acetate | 130.1 |
| | 223.8 |
| Monomer Delay | |
| Ethyl Acetate | 38.1 |
| Monomer Mix | 229.9 |
| | 268.0 |
| Initiator Delay | |
| Initiator Solution | 46.9 |
| Final Solvent | |
| Ethyl Acetate | 80.0 |
| Total | 618.7 |

Table 3 summarizes the polymer composition, MVTR values, and skin adhesion data for each of Examples 1–6 and Comparative Examples 1 and 2.

TABLE 3

Polymer Composition and Performance: Examples 1–6 and Comparative Examples 1 and 2

| Monomers (Wt. %) | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| 2-Ethylhexyl Acrylate | 12 | 12 | 12 | 12 | 35 | | 53 | 53 |
| Isooctyl Acrylate | | | | | | 12 | | |
| Butyl Acrylate | 55 | 55 | 52 | 55 | | 55 | | |
| Ethyl Acrylate | | | | | 35 | | | |
| 2-Hydroxyethyl Acrylate | 33 | 33 | 30 | 30 | 30 | 30 | 25 | 25 |
| Vinyl Pyrolidone | | | | 6 | | | | |
| Methyl Acrylate | | | | | | | 22 | 22 |
| Glycidyl Methacrylate | | | | | | | | 0.15 |
| Acrylic Acid | | | | | 3 | | | |
| Mol. Wt. ($M_w$) | 535K+ | 296K | 243K | 277K | 332K | 297 | 466K | 527K |
| Tg (° C.) | −24 | −24 | −20 | −21 | −23 | −21 | −19 | −23 |
| % Solids | 39.8 | 40.4 | 45.7 | 40 | 44.5 | 44.3 | 39.9 | 50.7 |
| Viscosity (cPs) | 9680 | 900 | 1884 | 1980 | 2596 | 1432 | 2628 | 16320 |
| Relative Viscosity (RV) | 5.9 | 2.6 | 2.2 | 2.5 | 2.8 | 2.6 | 3.7 | 3.8 |
| MVTR (g/m²/day) | 2203 | 2096 | 2084 | 2124 | 2024 | 2170 | 1636 | 1637 |
| Skin Adhesion | | | | | | | | |
| % Edge Lift | 14 | 1.4 | 0.9 | 12.1* | 0.7 | 1.0 | 1* | 4.4 |
| % Residue | 0.07 | 1.2 | 1.0 | 0* | 0.9 | 1.2 | 0* | 0.5 |

*samples tested after exposure to 25 kGy gamma irradiation
+Adhesive residue evaluated using a four point scale: 0 = none, 1 = low, 2 = medium, 3—high Table 4 summarizes adhesive performance (peel, shear, tack, and AAT) for different adhesives.

TABLE 4

Adhesive Performance of Selected Adhesives

|  | Ex. 1 | Ex. 2 | Ex. 3 | Ex. 4 | Ex. 5 | Ex. 6 | Compare 1 | Compare 2 |
|---|---|---|---|---|---|---|---|---|
| Coat Weight (g/m$^2$) | 25.7 | 27.5 | 27.8 | 26.7 | 26.4 | 27.2 | 26.7 | 27.6 |
| Facestock: Mylar | 96c | 5c | 15c | 13c | 16c | 4c | 28c | 39c |
| Shear 500 g, 1/2" × 1/2", RT, min. | | | | | | | | |
| Peel 180° off SS | | | | | | | | |
| 15 min., lb/in | 3.4p | 7.5c | 9.5p/fs | 10.3c | 5.8hps | 8.2fs | 4.4ps | 5.0ps |
| 24 hr., lb/in | 5.2ps | 7.6fs | 9.9fs | 10.6fs | 10.7fs | 7.7fs | 6.4c | 7.4c |
| Peel 180° off Glass | | | | | | | | |
| 15 min., lb/in | 3.8p | 7.5c | 9.3fs | 10.1c | 10.0p/fs | 7.9fs | 5.0ps | 5.8hps |
| 24 hr., lb/in | 5.1ps | 7.8fs | 9.3fs | 10.2fs | 10.1fs | 7.5fs | 6.2hps | 7.4c |
| Peel 90° off HDPE | 0.5z | 0.9z | 0.1z | 0.3z | 0.2z | 0.3z | 0.2z | 0.2z |
| Loop Tack off SS, lb/in | 3.5 | 3.9 | 4.7p | 3.6p | 3.8p | 4.2p | 3.8 | 3.8p |
| Loop Tack off Glass, lb/in | 3.1 | 6.4 | 5.9z | 4.8p | 4.8p | 6.4p | 4.4 | 5.4p |
| AAT | | | | | | | | |
| Force, N | 2.11 | 2.263 | 2.461 | 2.365 | 2.176 | 1.799 | 1.928 | 1.849 |
| Energy, Nm × 10$^{-5}$ | 31.6 | 18.9 | 30.7 | 31.0 | 42.7 | 22.7 | 57.3 | 77.3 |

Comparative Examples 3–6 and EXAMPLE 7

Five other polymers were prepared by copolymerizing various amounts of 2-ethylhexyl acrylate, butyl acrylate, hydroxyethyl acrylate and acrylic acid, using substantially the same polymerization protocol described in Example 1. 0.1% AAA was added as a crosslinker after polymerization. The relative amounts of monomers used are presented in Table 5, along with MVTR data for the resulting polymers.

TABLE 5

Acid-Containing Polymers: Comparative Examples 3–6 and Example 7

| Monomers (Wt. %) | C.Ex.3 | C.Ex.4 | C.Ex.5 | C.Ex.6 | Ex. 7 |
|---|---|---|---|---|---|
| 2-Ethylhexyl Acrylate | 67 | 32 | 39.5 | 47 | 12 |
| Butyl Acrylate | 20 | 55 | 37.5 | 20 | 55 |
| 2-Hydroxyethyl Acrylate | 10 | 10 | 20 | 30 | 30 |
| Acrylic Acid | 3 | 3 | 3 | 3 | 3 |
| Tg °C. | −46 | −38 | −33 | −27 | −24 |
| MVTR (g/m$^2$/day) | 1258 | 1566 | 1580 | 1618 | 2009 |

EXAMPLES 8–12

Five other copolymers were prepared by copolymerizing various monomers, using substantially the same polymerization protocol described in Example 1. Each of Examples 8 and 9 were made from 12, 55, and 33% by weight, respectively, of 2-EHA, BA, and HEA. Examples 10–12 were made from 12, 55, 30, and 3% by weight, respectively, of 2-EHA, BA, HEA, AND AA. The jacket temperature was set at 85° C. in Example 10. Crosslinked adhesives were prepared by compounding an acrylic copolymer prepared as described above with 0.1% or 0.2% by weight of AAA (based on the dry weight of the polymer) as a crosslinker. A solution of 1 part by weight AAA, 3 parts 2,4-pentane diol, and 6 parts toluene was added to the wet adhesive, which was then coated on a release liner and laminated to a facestock. Crosslinking was carried out by drying the adhesive-coated facestock or release liner at 70° C. for 15 minutes.

Table 6 summarizes the effect of crosslinking and molecular weight on adhesive performance for Ex. 1, 2 and 8–12.

TABLE 6

Effect of Polymer Molecular Weight and Crosslinking on Performance

| Monomers (Wt. %) | EHA/BA/HEA (12/55/33) | | | | EHA/BA/HEA/AA (12/55/30/3) | | | | | | | | |
|---|---|---|---|---|---|---|---|---|---|---|---|---|---|
| Example No. or Type | Ex. 1 | Ex. 2 | Ex. 8 | Ex. 9 | Ex. 10 | Ex. 10 | Ex. 10 | Ex. 11 | Ex. 11 | Ex. 11 | Ex. 12 | Ex. 12 | Ex. 12 |
| Mol. Wt. (M$_w$) | 535K+ | 331K | 499K | 598K | 316K | 316K | 316K | 436K | 436K | 436K | 513K | 513K | 513K |
| % AAA | none | none | none | none | none | 0.1% | 0.2% | None | 0.1% | 0.2% | none | 0.1% | 0.2% |
| RT shear off SS (min.) | 96c | 5c | 15c | 24c | 13c | 44c | 77c | 59c | 271c | 663c | 256c | 1390c | 3331c |
| 180° Peel off SS (lb./in.) | | | | | | | | | | | | | |
| 15 min. dwell | 3.4p | 7.5c | 4.9ps | 4.3ps | 8.8c | 6.4c | 4.5p | 9.2c | 5.0ps | 3.9p | 6.1ps | 4.4p | 3.5p |
| 24 hr. dwell | 5.2ps | 7.6fs | 9.8fs | 11.1fs | 8.7fs | 10.7fs | 6.2hps | 9.5fs | 8.1c | 5.4ps | 10.0fs | 7.1c | 4.7ps |
| Loop Tack off SS (lb./in.) | 3.5 | 3.9 | 3.6 | 3.1p | 3.6 | 3.4 | 3.3 | 3.7 | 3.3 | 3.1 | 3.1z | 2.9 | 2.4 |

TABLE 6-continued

Effect of Polymer Molecular Weight and Crosslinking on Performance

| Monomers (Wt. %) | EHA/BA/HEA (12/55/33) | | | | EHA/BA/HEA/AA (12/55/30/3) | | | | | | | | |
|---|---|---|---|---|---|---|---|---|---|---|---|---|---|
| Example No. or Type | Ex. 1 | Ex. 2 | Ex. 8 | Ex. 9 | Ex. 10 | Ex. 10 | Ex. 10 | Ex. 11 | Ex. 11 | Ex. 11 | Ex. 12 | Ex. 12 | Ex. 12 |
| AAT | | | | | | | | | | | | | |
| Force, N | 2.110 | 2.263 | 2.193 | 2.104 | 2.166 | 2.221 | 2.284 | 1.821 | 2.273 | 2.500 | 1.956 | 2.367 | 2.063 |
| Energy, Nm × $10^{-5}$ | 31.6 | 18.9 | 33.9 | 41.9 | 46.0 | 43.7 | 50.5 | 37.8 | 40.1 | 34.2 | 32.1 | 29.7 | 20.7 |
| Mocon MVTR (g/m$^2$/day) | 2203 | 2096 | 2092 | 2261 | 1950 | 2029 | 1960 | 1997 | 2021 | 2015 | 2055 | 1987 | 2066 |
| Adhesive Edge Lift (%) | 14 | 1.4 | nt | nt | 0.6 | 1.6 | 2.1 | 1.4 | 1.7 | 2.8 | 2.0 | 1.5 | 2.9 |
| TSC (%) | 39.8 | 40.4 | 40.2 | 40.6 | 41.0 | nt | nt | 40 | nt | nt | 39.7 | nt | Nt |
| Viscosity (cPs) | 9680 | 900 | 2990 | 5260 | 1000 | Nt | nt | 1980 | nt | nt | 4660 | nt | Nt | nt = not tested

The data shows that the MVTR is unaffected by the molecular weight of the polymer. Crosslinking with AAA also has no impact on the MVTR. The crosslinked samples have slightly higher edge lift, although it is still acceptable since it is lower than the 5% target. Crosslinking was also found to reduce the amount of adhesive residue left on the skin.

The effect of gamma sterilization is shown in Table 7. Gamma irradiation causes crosslinking of the adhesive, as seen by an increase in gel content and an increase in room temperature shear performance. This results in higher edge lift during wear tests on skin. The crosslinking is more severe at higher doses, as seen by the increase in gel at 50 kGy. Addition of N-vinyl pyrrolidone in the polymer composition helps reduce gel formation after sterilization. Antioxidants also help minimize the effect of sterilization. Even in the case of polymers made with acrylic acid, the effect of gamma irradiation on gel content is minimized if the molecular weight of the polymer is kept sufficiently low.

TABLE 7

Effect Of Irradiation

| Example No. and Monomers (Wt. %) | $M_w$ | Gamma Irradiation | % Gel in THF | Shear, RT (min.) | % Edge Lift |
|---|---|---|---|---|---|
| Ex. 3: EHA/BA/HEA/NVP | | | | | |
| (12/52/30/6) | 243K | none | 0 | 11 | 1 |
| " | " | 25k Gy | 27.1 | 1836 | 4 |
| " | " | 50k Gy | 53.7 | 4200+ | 12 |
| Ex. 2: EHA/BA/HEA | | | | | |
| (12/55/33) | 296K | none | 0 | 5 | 1 |
| " | " | 25k Gy | 39.5 | 1096 | 1 |
| " | " | 50k Gy | 60.5 | 4200+ | 10 |
| (12/55/33) plus 0.1% AAA | " | none | 1.5 | 18 | nt |
| (12/55/33) plus 0.1% AAA | " | 25k Gy | 52.8 | 4200+ | 1 |
| (12/55/33) plus 0.1% AAA | " | 50k Gy | 66.4 | nt | 9 |
| (12/55/33) plus 0.2% AAA | " | none | 29.3 | 116 | nt |
| (12/55/33) plus 0.2% AAA | " | 25k Gy | 54.9 | 4200 | nt |
| (12/55/33) plus 0.2% AAA | " | 50k Gy | 69.2 | nt | 18 |
| (12/55/33) | 335K | none | 0 | 6 | 2 |
| " | " | 25k gY | 41.6 | 1993 | 2 |
| " | " | 50k Gy | 64.7 | 4200 | 10 |
| (12/55/33) | 374K | none | 0 | 10 | 1 |
| " | " | 25k Gy | 58.1 | 4200+ | 11 |
| " | " | 50k Gy | 75.4 | nt | 31 |
| (12/55/33) plus 1% ANOX 20 | " | none | 0 | 10 | nt |
| (12/55/33) plus 1% ANOX 20 | " | 25k Gy | 44.2 | 2333 | 1 |
| (12/55/33) plus 1% ANOX 20 | " | 50k Gy | 61.2 | 4200+ | 24 |
| (12/55/33) | 406K | none | 0 | 14 | 3 |
| " | " | 25k Gy | 58.4 | 4200+ | 35 |
| " | " | 50k Gy | 74.3 | nt | 37 |
| (12/55/33) | 422K | none | 0 | 13 | 1 |
| " | " | 24k Gy | 52.1 | 4200+ | 8 |
| " | " | 50k Gy | 70.8 | nt | 19 |
| Ex. 4: EHA/BA/HEA/AA | | | | | |
| (12/55/30/3) | 277K | none | 0 | 13 | nt |
| " | " | 25k Gy | 32.9 | 1855 | 12 |
| " | " | 50k Gy | 47.5 | nt | 13 |

TABLE 7-continued

Effect Of Irradiation

| Example No. and Monomers (Wt. %) | $M_w$ | Gamma Irradiation | % Gel in THF | Shear, RT (min.) | % Edge Lift |
|---|---|---|---|---|---|
| " | 410K | none | 2 | 34 | 3 |
|  |  | 50k Gy | 67 | nt | 20 | nt: not tested
ANOX 20: Tetrakis-(methylene(3,5-di-tert-butyl-4-hydroxy-hydrocinnamate)methane, an antioxidant from Great Lakes Chemical Corp.

Table 8 shows the effect of elevated temperature aging on gel, shear and edge lift.

TABLE 8

Effect of Elevated Temperature Aging

| polymer | MW | % Gel in THF | Shear, RT, min | % Edge Lift |
|---|---|---|---|---|
| Ex. 3 | 243 | 2 | 15 | nt |
| Ex. 2 | 406 | 2 | 239 | 4 |
| Ex. 4 | 410 | 71 | 4200+ | 32 |

Example 3, containing N-vinyl pyrrolidone, exhibited a very small increase in gel and shear after elevated temperature aging. Example 2, containing no acrylic acid, exhibited an increase in shear; however, the % edge lift was still acceptably low. Example 4, containing acrylic acid and having a high molecular weight, exhibited a substantial increase in gel, shear, and adhesive edge lift after elevated temperature aging.

Table 9 presents MVTR measurements for different adhesives, on two different facestocks, both initially and after 25 and 50 kGy gamma irradiation. Three different MVTR test methods were used.

TABLE 9

A Comparison of MVTR Test Results

| Polymer | Additive | Facestock | Sterilization | MVTR, g/m2/d | | |
|---|---|---|---|---|---|---|
|  |  |  |  | Mocon | Upright Cup | Inverted Cup |
| Ex. 2 | none | Medifilm 390 | 25kGy | 2154 | 1940 | 3097 |
| Ex. 2 | none | Medifilm 390 | 50kGy | 2225 | 2000 | 3164 |
| Ex. 3 | none | Medifilm 390 | 25kGy | 2025 | 1914 | 2886 |
| Ex. 3 | none | Medifilm 390 | 50kGy | 2063 | 1828 | 2951 |
| Ex. 2 | 0.1% AAA | Medifilm 390 | 25kGy | 2147 | 1950 | 3011 |
| Ex. 2 | 0.1% AAA | Medifilm 390 | 50kGy | 2182 | 1916 | 3038 |
| Ex. 2 | 0.1% AAA + 1% Anox20 | Medifilm 390 | 25kGy | 2135 | 1963 | 3078 |
| Ex. 2 | 0.1% AAA + 1% Anox20 | Medifilm 390 | 50kGy | 2183 | 1931 | 3062 |
| Ex. 2 | none | Pebax 1074/3000 Blend | None | 2419 | 1964 | 3064 |
| Ex. 2 | none | Pebax 1074 | None | 2370 | 1981 | 2915 |

As indicated in Table 9, the Mocon test method yields MVTR values that are slightly higher than the values obtained with the upright cup method. The highest MVTR values are seen with the inverted cup method, where water is in direct contact with the sample. The table also shows that gamma sterilization has no effect on MVTR, and alternative facestocks, such as Pebax,. can be used to make high MVTR adhesive constructions.

The invention has been described and illustrated by exemplary and preferred embodiments, but is not limited thereto. Persons skilled in the art will appreciate that a variety of modifications can be made without departing from the scope of the invention, which is limited only by the claims. Throughout the text and the claims, use of the word "about" in relation to a range of numbers is intended to modify both the low and the high values stated.

What is claimed is:

1. A water vapor-permeable, pressure-sensitive adhesive (PSA), comprising:
   a solution copolymer characterized by an MVTR of at least 1,900 $g/m^2$/day, formed from a plurality of monomers in the presence of at least one solvent, the plurality of monomers comprising, on a percent-by-weight basis,
   (a) about 5 to 75% butyl acrylate and/or ethyl acrylate, about 5 to 45% 2-ethylhexyl acrylate and/or isooctyl acrylate, about 20 to 50% hydroxyethyl acrylate, 0 to about 10% of a N-vinyl lactam, and no carboxylic acid monomers; or
   (b) about 5 to 75% butyl acrylate and/or ethyl acrylate, about 5 to 45% 2-ethylhexyl acrylate and/or isooctyl acrylate, about 20 to 44% hydroxyethyl acrylate, 0 to about 10% of a N-vinyl lactam, and a positive amount up to about 6% acrylic acid and/or methacrylic acid.

2. A PSA as recited in claim 1, wherein the plurality of monomers comprises:
   about 5 to 75% by weight of butyl acrylate, about 5 to 45% by weight of 2-ethylhexyl acrylate,
   about 20 to 50% by weight of hydroxyethyl acrylate,
   0 to about 10% of N-vinyl pyrrolidone,
   and substantially no carboxylic acid monomers.

3. A PSA as recited in claim 1, wherein the plurality of monomers comprises about 75% by weight of butyl acrylate and/or ethyl acrylate, about 5% by weight of 2-ethylhexyl acrylate and/or isooctyl acrylate, and about 20% by weight of hydroxyethyl acrylate.

4. A PSA as recited in claim 1, wherein the plurality of monomers comprises about 45% by weight of butyl acrylate and/or ethyl acrylate, about 5% by weight of 2-ethylhexyl acrylate and/or isooctyl acrylate, and about 50% by weight of hydroxyethyl acrylate.

5. A PSA as recited in claim 1, wherein the plurality of monomers comprises about 20% by weight of butyl acrylate and/or ethyl acrylate, about 30% by weight of 2-ethylhexyl acrylate and/or isooctyl acrylate, and about 50% by weight of hydroxyethyl acrylate.

6. A PSA as recited in claim 1, wherein the plurality of monomers comprises about 5% by weight of butyl acrylate and/or ethyl acrylate, about 45% by weight of 2-ethylhexyl acrylate and/or isooctyl acrylate, and about 50% by weight of hydroxyethyl acrylate.

7. A PSA as recited in claim 1, wherein the plurality of: monomers comprises about 55% by weight of butyl acrylate and/or ethyl acrylate, about 12% by weight of 2-ethylhexyl acrylate and/or isooctyl acrylate, and about 33% by weight of hydroxyethyl acrylate.

8. A PSA as recited in claim 1, wherein the plurality of monomers comprises about 52% by weight of butyl acrylate and/or ethyl acrylate, about 12% by weight of 2-ethylhexyl acrylate and/or isooctyl acrylate, about 30% by weight of hydroxyethyl acrylate, and about 6% by weight of N-vinyl pyrrolidone.

9. A PSA as recited in claim 1, wherein the plurality of monomers comprises about 52% by weight of butyl acrylate and/or ethyl acrylate, about 12% by weight of 2-ethylhexyl acrylate and/or isooctyl acrylate, about 33% by weight of hydroxyethyl acrylate, and about 3% by weight of N-vinyl pyrrolidone.

10. A PSA as recited in claim 1, wherein the plurality of monomers includes no carboxylic acid monomers, and the copolymer has a weight-average molecular weight of from about 200,000 to 600,000.

11. A PSA as recited in claim 1, wherein the copolymer is formed of a plurality of monomers that includes one or more carboxylic acid monomers, and the copolymer has a weight-average molecular weight below about 300,000.

12. A PSA as recited in claim 1, wherein the copolymer is compounded with a crosslinker.

13. A PSA as recited in claim 12, wherein the crosslinker comprises aluminum acetylacetonate.

14. A PSA as recited in claim 1, wherein the N-vinyl lactam is N-vinyl pyrrolidone.

15. A PSA as recited in claim 1, wherein the copolymer has a glass transition temperature of from about −25° C. to −15° C.

16. A PSA as recited in claim 1, characterized by low adhesive edge lift when applied to skin.

17. A PSA as recited in claim 16, characterized by low edge lift even after exposure to 25 kGy gamma irradiation.

18. A PSA as recited in claim 16, characterized by low edge lift even after exposure to 50 kGy gamma irradiation.

19. A PSA as recited in any one of claims 1, 2, 8, 9, 10, 11, 12, 13, 14, or 15, coated on or applied to a water vapor-permeable facestock.

20. A PSA as recited in claim 19, wherein the facestock is selected from the group consisting of copolyester thermoplastic elastomers, polyurethanes, polyether block amides, woven. fabrics, and non-woven fabrics.

21. A water vapor-permeable, PSA construction comprising a PSA copolymer coated on or applied to a flexible facestock having a MVTR of 4,000 g/m$^2$/day or higher, said PSA comprising a solution copolymer characterized by an MVTR of at least 1,900 g/m$^2$/day formed from a plurality of monomers in the presence of at least one solvent, the plurality of monomers comprising, on a percent by weight basis, (a) about 5 to 75% butyl acrylate and/or ethyl acrylate, about 5 to 45% 2-ethylhexyl acrylate and/or isooctyl acrylate, about 20 to 50% hydroxyethyl acrylate, 0 to about 10% of a N-vinyl lactam, and no carboxylic acid monomers; or (b) about 5 to 75% butyl acrylate and/or ethyl acrylate, about 4 to 45% 2-ethylhexyl acrylate and/or isooctyl acrylate, about 20 to 50% hydroxyethyl acrylate, 0 to about 10% of a N-vinyl lactam, and a positive amount up to about 6% acrylic acid and/or methacrylic acid.

22. A PSA as recited in claim 1, wherein the at least one solvent is selected from the group consisting of ethyl acetate, methanol, toluene, methyl ethyl ketone, acetone, hexane, and isopropyl alcohol.

23. A PSA construction as recited in claim 21, wherein the at least one solvent is selected from the group consisting of ethyl acetate, methanol, toluene, methyl ethyl ketone, acetone, hexane, and isopropyl alcohol.

* * * * *